United States Patent
Kim et al.

(10) Patent No.: US 9,781,747 B2
(45) Date of Patent: Oct. 3, 2017

(54) METHOD AND APPARATUS FOR TRANSMITTING RANDOM ACCESS CHANNEL DESIGNED FOR TRANSMISSION IN HIGH CARRIER FREQUENCY IN A WIRELESS COMMUNICATION SYSTEM

(71) Applicant: LG ELECTRONICS INC., Seoul (KR)

(72) Inventors: Kitae Kim, Anyang-si (KR); Jinmin Kim, Anyang-si (KR); Hyunsoo Ko, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 109 days.

(21) Appl. No.: 14/763,473

(22) PCT Filed: Aug. 20, 2013

(86) PCT No.: PCT/KR2013/007452
§ 371 (c)(1),
(2) Date: Jul. 24, 2015

(87) PCT Pub. No.: WO2014/119832
PCT Pub. Date: Aug. 7, 2014

(65) Prior Publication Data
US 2015/0373743 A1 Dec. 24, 2015

Related U.S. Application Data

(60) Provisional application No. 61/757,720, filed on Jan. 29, 2013.

(51) Int. Cl.
*H04W 74/08* (2009.01)
*H04L 5/00* (2006.01)
*H04L 27/26* (2006.01)

(52) U.S. Cl.
CPC ....... *H04W 74/0833* (2013.01); *H04L 5/0048* (2013.01); *H04L 27/2613* (2013.01)

(58) Field of Classification Search
None
See application file for complete search history.

(56) References Cited

U.S. PATENT DOCUMENTS

| | | | |
|---|---|---|---|
| 2009/0067540 A1* | 3/2009 | Lee | H04W 74/004 375/296 |
| 2009/0109919 A1 | 4/2009 | Bertrand et al. | |

(Continued)

FOREIGN PATENT DOCUMENTS

EP 2538714 12/2012

OTHER PUBLICATIONS

PCT International Application No. PCT/KR2013/007452, Written Opinion of the International Searching Authority dated Dec. 24, 2013, 9 pages.

*Primary Examiner* — Edan Orgad
*Assistant Examiner* — Saumit Shah
(74) *Attorney, Agent, or Firm* — Lee Hong Degerman Kang Waimey (57) ABSTRACT

A method for transmitting a random access preamble at a user equipment in a wireless communication system is disclosed. The method includes determining a random access sequence transmission period using a random access sequence, configuring a random access preamble by inserting a cyclic prefix at a front of the random access sequence transmission period and a guard time at an end of the random access sequence transmission period, and transmitting the random access preamble on a random access channel to a base station. The random access preamble is configured by repeating the random access sequence a predetermined number of times, if the length of the random access sequence (Continued)

is smaller than the random access sequence transmission period.

6 Claims, 9 Drawing Sheets

(56) References Cited

U.S. PATENT DOCUMENTS

| | | |
|---|---|---|
| 2009/0305693 A1 | 12/2009 | Shimomura et al. |
| 2010/0054235 A1* | 3/2010 | Kwon .................... H04J 13/16 370/350 |
| 2012/0057495 A1 | 3/2012 | Iwai et al. |
| 2013/0016656 A1 | 1/2013 | Satou |

* cited by examiner

FIG. 1

-- Prior Art --

FIG. 2

(a) contol - plane protocol stack (b) user - plane protocol stack

METHOD AND APPARATUS FOR TRANSMITTING RANDOM ACCESS CHANNEL DESIGNED FOR TRANSMISSION IN HIGH CARRIER FREQUENCY IN A WIRELESS COMMUNICATION SYSTEM

CROSS-REFERENCE TO RELATED APPLICATIONS

This application is the National Stage filing under 35 U.S.C. 371 of International Application No. PCT/KR2013/007452, filed on Aug. 20, 2013, which claims the benefit of U.S. Provisional Application No. 61/757,720, filed on Jan. 29, 2013, the contents of which are all hereby incorporated by reference herein in their entirety.

TECHNICAL FIELD

The present invention relates to a wireless communication system, and more particularly, to a method and apparatus for transmitting a random access channel designed for transmission in a high carrier frequency in a wireless communication system.

BACKGROUND ART

A brief description will be given of a 3rd Generation Partnership Project Long Term Evolution (3GPP LTE) system as an example of a wireless communication system to which the present invention can be applied.

Figure 1:
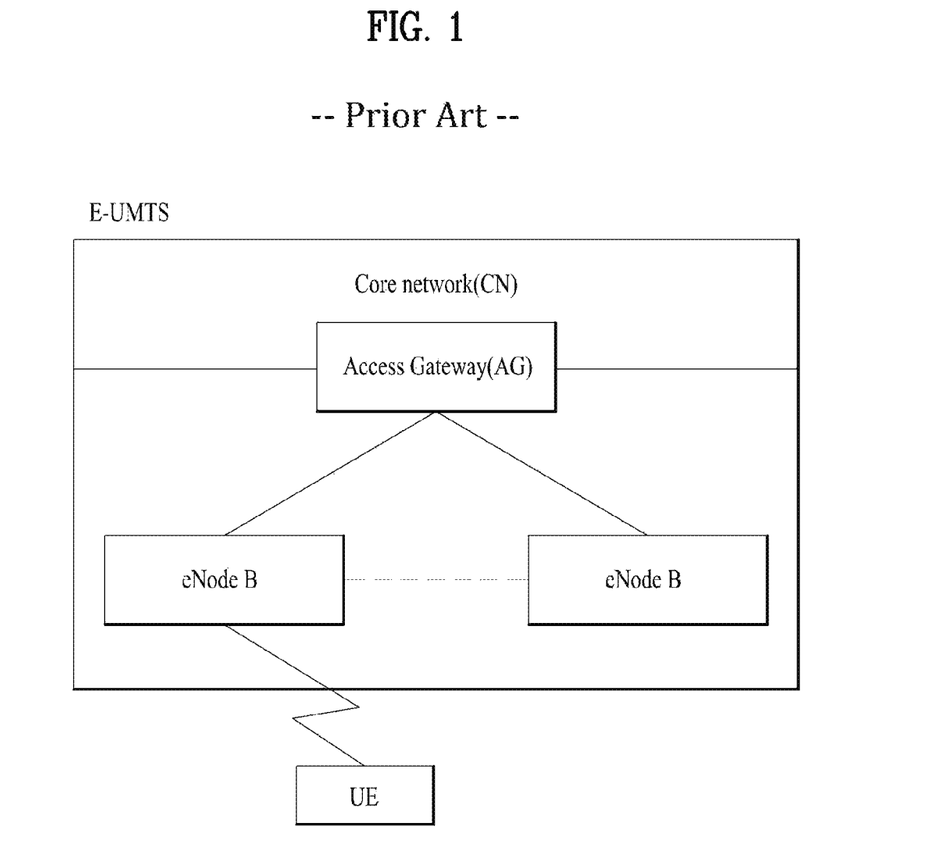
FIG. 1 illustrates a configuration of an Evolved Universal Mobile Telecommunications System (E-UMTS) network as an example of a wireless communication system.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.4, 3, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARM) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE

Technical Problem

An object of the present invention devised to solve the problem lies on a method and apparatus for transmitting a random access channel designed for transmission in a high carrier frequency in a wireless communication system.

Technical Solution

The object of the present invention can be achieved by providing a method for transmitting a random access preamble at a user equipment in a wireless communication system is disclosed. The method includes determining a random access sequence transmission period using a random access sequence, configuring a random access preamble by inserting a cyclic prefix at a front of the random access sequence transmission period and a guard time at an end of the random access sequence transmission period, and transmitting the random access preamble on a random access channel to a base station. The random access preamble is configured by repeating the random access sequence a predetermined number of times, if the length of the random access sequence is smaller than the random access sequence transmission period.

In another aspect of the present invention, provided herein is a user equipment in a wireless communication system, including a processor for determining a random access sequence transmission period using a random access sequence and configuring a random access preamble by inserting a cyclic prefix at a front of the random access sequence transmission period and a guard time at an end of the random access sequence transmission period, and a transmission module for transmitting the random access preamble on a random access channel to a base station. The processor configures the random access preamble by repeating the random access sequence a predetermined number of times, if the length of the random access sequence is smaller than the random access sequence transmission period.

If the length of the random access sequence is smaller than the random access sequence transmission period, the random access preamble may be configured by repeating the random access sequence the predetermined number of times along a time axis or along a frequency axis.

The predetermined number may be a quotient of dividing the random access sequence transmission period by the length of the random access sequence.

If the random access preamble is configured by repeating the random access sequence the predetermined number of times along the frequency axis, a subcarrier spacing of the random access channel may be increased by a multiple of the predetermined number.

The random access sequence $x_m$ repeated the predetermined number of times may be expressed as [Equation A], $$x_m = x_p$$ [Equation A]
$$\begin{cases} p = \lfloor m/R \rfloor \\ 0 \le m < R \cdot N_{SEQ} \end{cases}$$

where $x_p$ is a random access sequence of length $N_{SEQ}$ and R is the predetermined number.

Advantageous Effects

According to the embodiments of the present invention, a User Equipment (UE) can efficiently transmit a random access channel in a high carrier frequency in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

Figure 2:
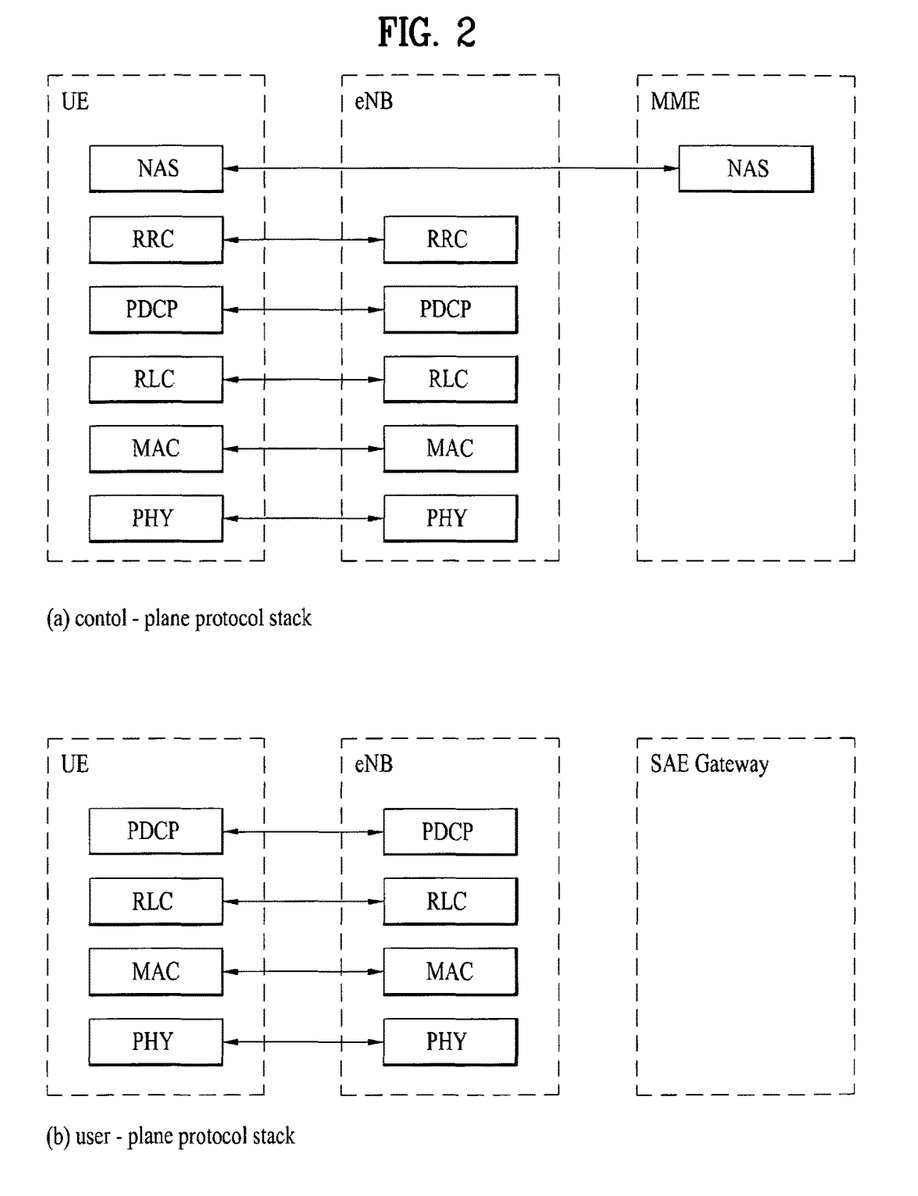
FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN)

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for downlink and in Single Carrier Frequency Division Multiple Access (SC-FDMA) for uplink.

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of Radio Bearers (RBs). An RB refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

A cell covered by an eNB is set to one of the bandwidths of 1.4, 3, 5, 10, 15, and 20 MHz and provides downlink or uplink transmission service in the bandwidth to a plurality of UEs. Different cells may be set to provide different bandwidths.

Downlink transport channels used to deliver data from the E-UTRAN to UEs include a Broadcast Channel (BCH) carrying system information, a Paging Channel (PCH) carrying a paging message, and a Shared Channel (SCH) carrying user traffic or a control message. Downlink multicast traffic or control messages or downlink broadcast traffic or control messages may be transmitted on a downlink SCH or a separately defined downlink Multicast Channel (MCH). Uplink transport channels used to deliver data from a UE to the E-UTRAN include a Random Access Channel (RACH) carrying an initial control message and an uplink SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
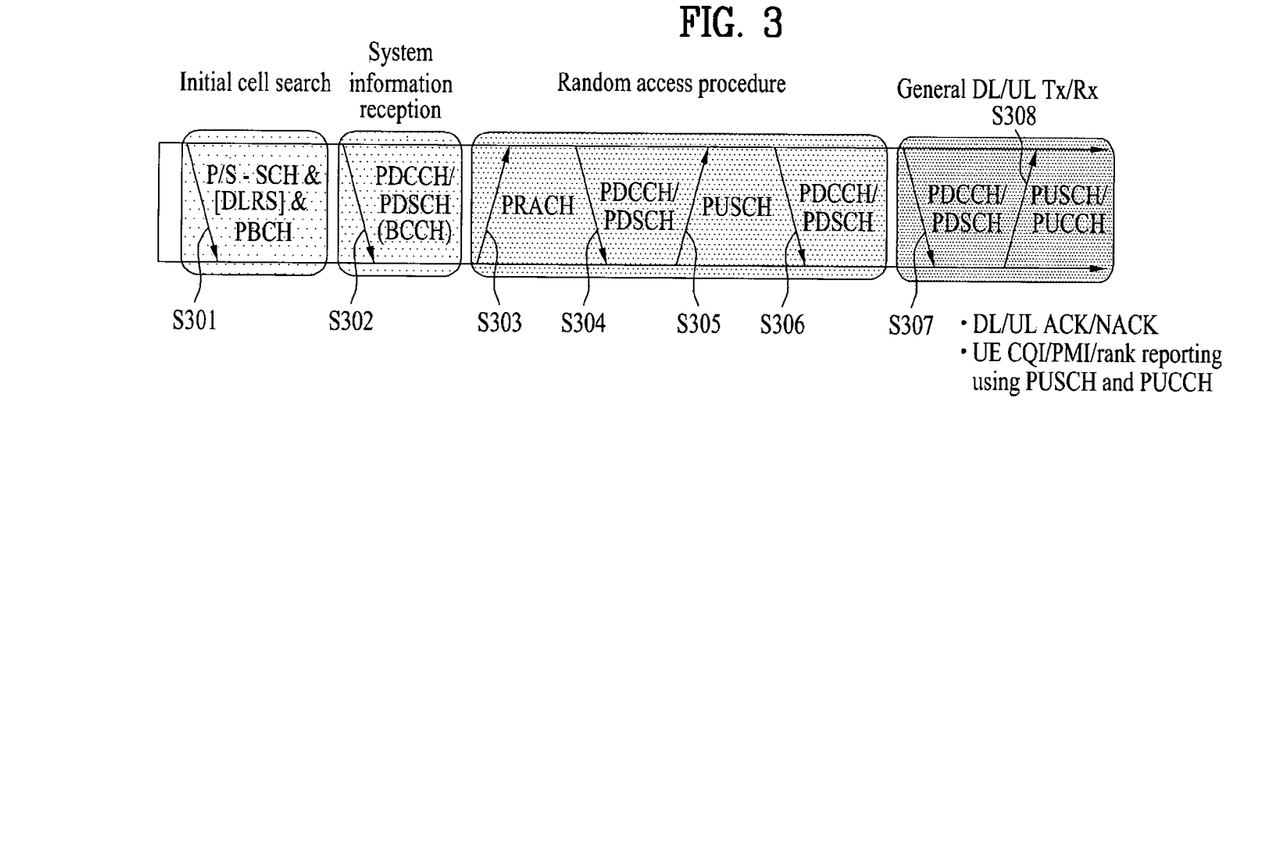
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a downlink channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general downlink and uplink signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the uplink or receives from the eNB on the downlink includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
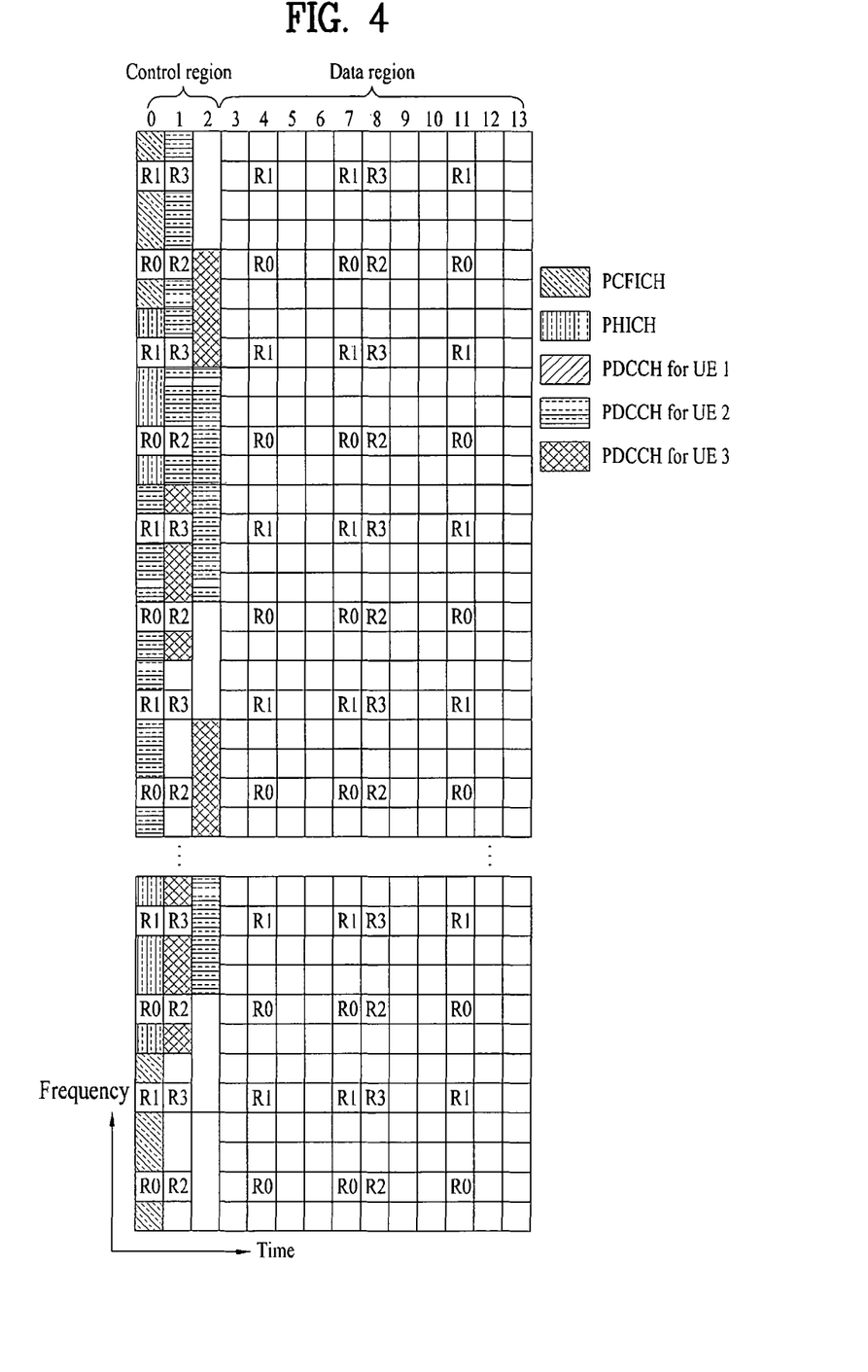
FIG. 4 illustrates a structure of a downlink radio frame in a Long Term Evolution (LTE) system.

FIG. 4 illustrates exemplary control channels included in the control region of a subframe in a DL radio frame.

Referring to FIG. 4, a subframe includes 14 OFDM symbols. The first one to three OFDM symbols of a subframe are used for a control region and the other 13 to 11 OFDM symbols are used for a data region according to a subframe configuration. In FIG. 4, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH is composed of 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH indicates 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for an uplink transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical downlink control channel allocated to the first n OFDM symbols of a subframe. Herein, n is 1 or a larger integer indicated by the PCFICH. The PDCCH is composed of one or more CCEs. The PDCCH carries resource allocation information about transport channels, PCH and DL-SCH, an uplink scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 5:
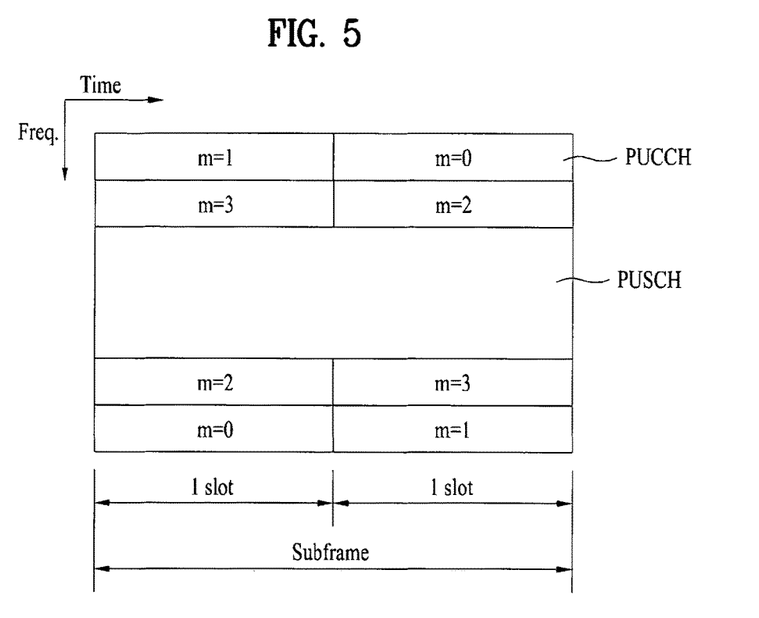
FIG. 5 illustrates a structure of an uplink subframe in the LTE system.

FIG. 5 illustrates a structure of a UL subframe in the LTE system.

Referring to FIG. 5, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one Resource Block (RB) in each slot of a subframe. That is, the two RBs allocated to the PUCCH frequency-hop over the slot boundary of the subframe. Particularly, PUCCHs with m=0, m=1, and m=2 are allocated to a subframe in FIG. 5.

Introduction of local areas to the LTE system in the future is under, consideration. To reinforce service support per user, it is expected that a new cell will be deployed based on the concept of local area access.

Figure 6:
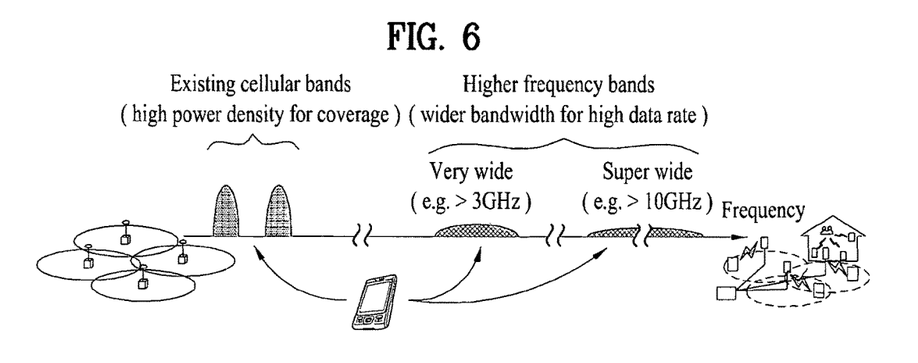
FIG. 6 illustrates the concept of a small cell, which is expected to be introduced to the LTE system.

FIG. 6 illustrates the concept of a small cell, which is expected to be introduced to the LTE system.

Referring to FIG. 6, it is expected that a wider system bandwidth is set in a frequency band having a higher center frequency, not in a frequency band used in the legacy LTE system. Basic cell coverage may be supported based on a control signal such as system information in an existing cellular frequency band, whereas data may be transmitted with maximum transmission efficiency in a wider frequency band in a high-frequency small cell. Thus, the concept of local area access targets at UEs with low-to-medium mobility in a small area and small cells will be deployed, each having a distance between a Base Station (BS) and a UE in units of 100 m, smaller than existing cells having distances between a UE and a BS in units of km.

Due to shorter distances between UEs and a BS and the use of a high carrier frequency, these small cells may have the following channel characteristics.

First of all, from the perspective of delay spread, as the distance between a BS and a UE is shorter, a signal delay may be also shorter. If the same OFDM-based frame as used in the LTE system is adopted, a subcarrier spacing may be set to an extremely large value, for example, a value larger than the existing subcarrier spacing 15 kHz because a relatively wide frequency band is allocated. A Doppler's frequency is higher in a high frequency band than in a low frequency band, for the same UE speed. Therefore, a coherence time may be extremely short. The coherence time is the time over which a channel has static or uniform characteristics. A coherent bandwidth is a bandwidth in which a channel has static or uniform characteristics in time.

Only when a UE is synchronized with a BS, the UE may transmit a UL signal and may be scheduled for data transmission. A main role of an RACH is radio access in a transmission scheme that makes asynchronous UEs orthogonal to one another or prevents coincident accesses of the UEs as much as possible. The RACH will be described in greater detail.

Regarding the usage and requirements of the RACH, a main function of the RACH is UL initial access and short message transmission. Although initial network access and short message transmission take place on the RACH in a Wideband Code Division Multiple Access (WCDMA) system, short message transmission is not performed through the RACH in the LTE system. In addition, the RACH is transmitted separately from an existing UL data channel in the LTE system, compared to the WCDMA system. That is, while a UL data channel, PUSCH has a symbol structure with a basic subcarrier spacing $\Delta f$ set to 15 kHz, the RACH has an SC-FDMA structure with a subcarrier spacing $\Delta f_{RA}$ set to 1.25 kHz. Once UL synchronization is acquired between a BS and a UE, the UE is scheduled for orthogonal resource allocation and transmission in the LTE system.

Figure 7:
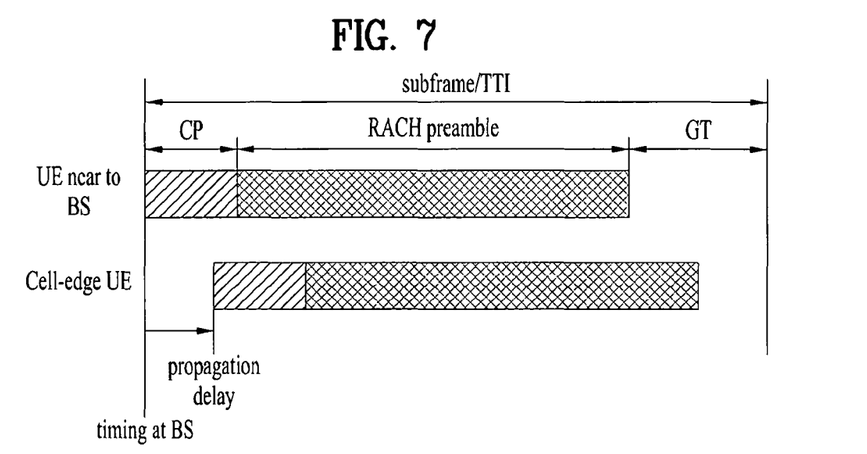
FIG. 7 illustrates a structure of a Random Access Channel (RACH) preamble.

The structure of an RACH preamble will be described below. FIG. 7 illustrates a structure of an RACH preamble.

Referring to FIG. 7, an RACH preamble includes a Cyclic Prefix (CP), a preamble sequence, and a Guard Time (GT). The CP is used to compensate for a maximum channel delay spread and a Round Trip Time (RTT), and the GT is used to compensate for the RTT. The CP is a copy of the last part of an OFDM symbol, inserted into the CP period of the preamble.

On the assumption that it has been synchronized with a BS, a UE transmits an RACH preamble to the BS. If the UE is near to the BS, the BS receives the RACH almost in alignment with a subframe boundary. On the other hand, if the UE is remote from the BS, for example, the UE is at a cell edge, the BS receives the RACH later than a nearby UE's RACH due to a propagation delay. Because the BS has knowledge of a preamble sequence transmitted by each UE, the BS may perform a synchronization process based on the detected position of the preamble transmitted by each UE.

Many sequences are available for an RACH preamble. For example, a Zadoff-Chu (ZC) sequence based on auto-correlation and a pseudorandom sequence based on cross-correlation are popular. In general, the ZC sequence based on auto-correlation may be selected in a low intra-cell interference environment and the pseudorandom sequence based on cross-correlation may be selected in a high intra-cell interference environment.

In the LTE system, 1) the intra-cell interference between different preambles using the same time-frequency RACH resources should be low; 2) since detection performance increases with the use of more orthogonal preambles, the detection performance of a BS should be increased by defining more orthogonal preambles for a smaller cell; 3) the detection complexity of the BS should be reduced; and 4) a fast UE should also be supported. To meet the above requirements, the LTE system uses a ZC sequence of length 839 expressed as [Equation 1], for an RACH preamble.

$$x_u(n) \cdot = e^{-j\frac{\pi u n(n+1)}{N_{ZC}}}, 0 \le n \le N_{ZC} - 1 (N_{ZC} = 839) \quad \text{[Equation 1]}$$

However, if the intra-cell interference is high, a pseudo-random sequence expressed as [Equation 2] may be used for an RACH preamble.

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$

$$c(n) = (x_1(n+N_C) + x_2(n+N_C)) \bmod 2 \quad \text{[Equation 2]}$$

Now, a description will be given of a transmission bandwidth for an RACH preamble. Two main factors taken into account in setting an RACH bandwidth are diversity gain and restriction of UE transmission power. Since a UE has limited power amplifier performance relative to a BS, energy per resource unit is decreased but frequency diversity is maximized by transmitting an RACH in a wide frequency band. On the contrary, if an RACH preamble is transmitted in a narrow frequency band, energy per resource unit is increased but frequency diversity is minimized.

When an LTE RACH transmission bandwidth is determined actually, 1.08 MHz, 2.16 MHz, 4.5 MHz, and 50 MHz (having 6 RBs, 12 RBs, 25 RBs, and 50 RBs, respectively) are candidates. Since it is revealed from a comparison of RACH non-detection probabilities that 6 RBs is enough to satisfy a non-detection probability of 1%, 1.08 MHz is determined as a final RACH transmission bandwidth.

The length of an RACH preamble sequence will be described now. To determine the length $T_{SEQ}$ of an RACH preamble sequence, conditions for the low and upper bounds of the sequence length $T_{SEQ}$ and a subcarrier spacing should be satisfied.

The lower bound of the sequence length $T_{SEQ}$ should be larger than the sum of the RTT and maximum channel delay spread of a cell-edge UE within coverage in order to eliminate detection ambiguity. That is, [Equation 3] should be satisfied.

$$T_{SEQ} \geq \frac{2 \cdot d_{long}}{3 \times 10^8} + \tau_{max} - \text{condition \#1} \quad \text{[Equation 3]}$$

In [Equation 3], $d_{long}$ represents the service coverage and $\tau_{max}$ represents the maximum channel delay spread. For example, it is assumed that the largest cell has a radius of 100 km and the maximum channel delay spread of the cell is 16.67 μs in the LTE system. It is also assumed that service coverage in a high carrier frequency is 3 km and the maximum channel delay spread of the high carrier frequency is 0.5 μs. On these assumptions, the following [Equation 4] and [Equation 5] are given.

$$T_{SEQ} \geq \frac{2 \cdot 100 \text{ km}}{3 \times 10^8} + 16.67 \text{ us} = 683.33 \text{ us} - \text{LTE case} \quad \text{[Equation 4]}$$

$$T_{SEQ} \geq \frac{23 \text{ km}}{3 \times 10^8} + 0.5 \text{ us} = \quad \text{[Equation 5]}$$
$$40.5 \text{ us} - \text{High carrier frequency case}$$

If the upper bound of the sequence length $T_{SEQ}$ is determined in conformance to a general frame standard, the upper bound cannot exceed a given Transmission Time Interval (TTI). If a subframe is 1 ms long as in the LTE system, the TTI is 1 ms. Herein, a maximum sequence period is based on the assumption of service coverage in which a UE is nearest to a BS and the maximum channel delay spread is 0 μs. Accordingly, condition #2 expressed as [Equation 6] should be satisfied.

$$T_{SEQ} \leq TTI - 2 \times \frac{2 \cdot d_{short}}{3 \times 10^8} - \text{Condition \#2} \quad \text{[Equation 6]}$$

In [Equation 6], $d_{short}$ represents the service coverage in which a UE is nearest to a BS. For example, $d_{short}$ is 14.4 km in the LTE system and $d_{short}$ is 1 km in the high carrier frequency. If the TTI is 222 ms in the high carrier frequency, [Equation 7] and [Equation 8] are resulted.

$$T_{SEQ} \leq 1 \text{ ms} - 2 \times \frac{2 \cdot 14.4 \text{ km}}{3 \times 10^8} = 813 \text{ us} - \text{LTE case} \quad \text{[Equation 7]}$$

$$T_{SEQ} \leq 222 \text{ ms} - 2 \times \frac{2 \cdot 1 \text{ km}}{3 \times 10^8} = \quad \text{[Equation 8]}$$
$$208.3 \text{ us} - \text{High carrier frequency case}$$

Finally, a requirement for the RACH subcarrier spacing $\Delta f_{RA}$ will be described below.

If a sampling frequency $N_{DFT}$ being the reciprocal of the sequence length $T_{SEQ}$ is in the relationship that $N_{DFT} = f_s \cdot T_{SEQ}$, maximum orthogonality is ensured between UL subcarriers of an existing frame and RACH subcarriers. Because the subcarrier spacing $\Delta f$ of the existing frame should be an integer multiple of the RACH subcarrier spacing $\Delta f_{RA}$, condition #3 given as [Equation 9] should be satisfied.

$$\Delta f_{RA} = \frac{f_s}{N_{DFT}} = \frac{1}{T_{SEQ}} = \frac{1}{k \cdot T_{SYM}} = \frac{\Delta f}{k} - \text{Condition \#3} \quad \text{[Equation 9]}$$

In this case, the RACH subcarrier spacing $\Delta f_{RA}$ is determined in the LTE system by the following equation.

$$\Delta f_{RA} = \frac{30.72 \text{ MHz}}{2048} = \quad \text{[Equation 10]}$$
$$\frac{1}{800 \text{ us}} = \frac{1}{12 \cdot 66.67 \text{ us}} = \frac{15 \text{ kHz}}{12} = 1.25 \text{ kHz}$$

Hereinbelow, an exemplary setting of an RACH preamble period for RACH transmission in a high carrier frequency, satisfying condition #1, condition #2, and condition #3 will be described. For a minimum service coverage of 1 km and a maximum service coverage of 3 km, an RTT is calculated and a maximum channel delay spread of 0.5 μs is considered.

TABLE 1

| Coverage | RTT (GP) | CP for RACH (RTT + 0.5 us) | GP + CP | TTI candidate | TTI− (GP + CP) Sequence duration |
|---|---|---|---|---|---|
| 1 km (short) | 6.6 us | 7.1 us | 13.7 us | 222 us | 208.3 us |
| | | | | 767 us | 754.3 us |
| | | | | 125 us | 111.3 us |
| 3 km (long) | 20.0 us | 20.5 us | 40.5 us | 222 us | 181.9 us |
| | | | | 767 us | 726.9 us |
| | | | | 125 us | 84.9 us |

If the service coverage is 3 km and the TTI is 222 μs, an RACH preamble period and a CP are calculated by [Table 2].

TABLE 2

$k = \Delta f/\Delta f_{RA} = 18 \leq \lfloor T_{SEQ}/T_{SYM} \rfloor = \lfloor 181.9 \text{ us}/(1/104.25 \text{ kHz}) \rfloor = 18$
$\Delta f_{RA} = \Delta f/k = 104.24 \text{ kHz}/18 = 5.7917 \text{ kHz}$
$T_{SEQ} = 1/\Delta f_{RA} = 1.7266 \text{ us}$
$T_{CP} = 20.5 \text{ us}$ As noted from [Table 3] below, condition #1, condition #2, and condition #3 are all satisfied with the calculated sequence length $T_{SEQ}$=172.66 us

TABLE 3

Figure 8:
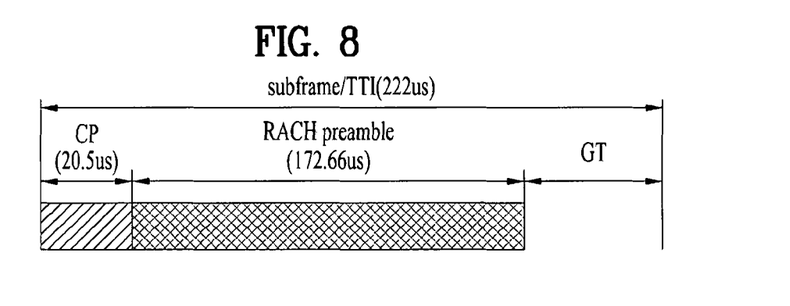
FIG. 8 illustrates an exemplary setting of a Cyclic Prefix (CP) and a transmission period for an RACH preamble to transmit the RACH preamble in a high carrier frequency.

Condition #1: $T_{SEQ} = 172.66 \text{ us} \geq \frac{2 \cdot 3 \text{ km}}{3 \times 10^8} + 0.5 \text{ us} = 40.5 \text{ us}$ Condition #2: $T_{SEQ} = 172.66 \text{ us} \leq 222 \text{ ms} - 2 \times \frac{2 \cdot 3 \text{ km}}{3 \times 10^8} = 181.9 \text{ us}$ Condition #3: $\Delta f_{RA} = \Delta f/k = 104.24 \text{ kHz}/18 = 5.7917 \text{ kHz}$ Therefore, a final RACH preamble may be configured as illustrated in FIG. 8. FIG. 8 illustrates an exemplary setting of a CP and a transmission period for an RACH preamble, for RACH preamble transmission in a high carrier frequency. In the illustrated case of FIG. 8, the service coverage is 3 km and the TTI is 222 μs.

In another example, if the service coverage is 1 km and the TTI is 125 μs, the values illustrated in [Table 4] may be calculated.

TABLE 4

$k = \Delta f/\Delta f_{RA} = 12 \leq \lfloor T_{SEQ}/T_{SYM} \rfloor = \lfloor 111.3 \text{ us}/(1/120 \text{ kHz}) \rfloor = 13$
$\Delta f_{RA} = \Delta f/k = 120 \text{ kHz}/12 = 10 \text{ kHz}$
$T_{SEQ} = 1/\Delta f_{RA} = 100 \text{ us}$
$T_{CP} = 7.1 \text{ us}$ As noted from [Table 5] below, condition #1, condition #2, and condition #3 are all satisfied with the calculated sequence length $T_{SEQ}$=100 us.

TABLE 5

Figure 9:
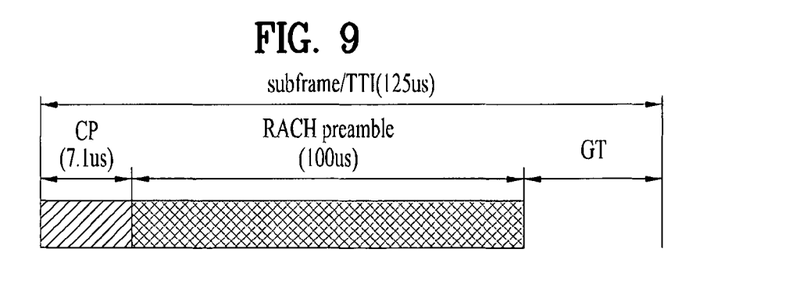
FIG. 9 illustrates another exemplary setting of a CP and a transmission period for an RACH preamble to transmit the RACH preamble in a high carrier frequency.

Condition #1: $T_{SEQ} = 100 \text{ us} \geq \frac{2 \cdot 1 \text{ km}}{3 \times 10^8} + 0.5 \text{ us} = 7.1 \text{ us}$ Condition #2: $T_{SEQ} = 100 \text{ us} \leq 125 \text{ ms} - 2 \times \frac{2 \cdot 1 \text{ km}}{3 \times 10^8} = 111.3 \text{ us}$ Condition #3: $\Delta f_{RA} = \Delta f/k = 120 \text{ kHz}/12 = 10 \text{ kHz}$ Therefore, a fmal RACH preamble may be configured as illustrated in FIG. 9. FIG. 9 illustrates another exemplary setting of a CP and a transmission period for an RACH preamble, for RACH preamble transmission in a high carrier frequency. In the illustrated case of FIG. 9, the service coverage is 1 km and the TTI is 125 μs.

To verify whether a target area of a sequence satisfying condition #1, condition #2, and condition #3 is appropriately designed, link budget parameters listed in [Table 6] may be used.

| Parameter | LTE value | Higher Carrier Band |
| --- | --- | --- |
| Carrier frequency($f_c$) | 2 GMHz | 30 GHz |
| eNB antenna height($h_b$) | 30 m/60 m | 10 m(3 GPP 36.814 UMI) |
| UE antenna height($h_m$) | 1.5 m | 1.5 m |
| UE transmit Power ($P_{max}$, EIRP) | 24 dBm(250 mW) | 24 dBm |
| eNB receiver Ant. Gain ($G_a$) | 14 dBi | 14 dBi |
| ReceivingNoise Figure($N_f$) | 5 dB | 5 dB |
| Thermal Noise Density($N_0$) | −174 dBm/Hz | −174 dBm/Hz |
| Required ($E_p/N_0$) | 18 dB | 18 dB |
| Penetration loss (PL) | 0 dB | 0 dB(outdoor) |
| Log-normal fading margin(LF) | 0 dB | 0 dB(outdoor) |
| PL model(L(d))[dB] | Okumura-Hata (Suburban areas) | LMDS channel model (Good, Bad) + Margin w.r.t height |
| Target coverage(d)[km] | About 14 km | 3 km(RTT = 19.8 us) |

The target area of the sequence is finally verified by [Equation 11].

$$T_{SEQ} = \frac{N_0 N_f}{P_{RA}(d)} \frac{E_P}{N_0} \quad \text{[Equation 11]}$$

[Equation 11] is expressed as a function of distance d by which an appropriate effective distance may be estimated. A verification example regarding an LTE case and a high carrier frequency case with a service coverage of 3 km and a TTI of 222 μs will be described below. It is assumed that the maximum channel delay spread is 0.5 μs.

A path loss function $P_{RA}(d)$ in [Equation 11] may be represented as [Equation 12], in terms of dB.

$$P_{RA}(d) = P_{max} + G_a - L(d) - LF - PL(dB) \quad \text{[Equation 12]}$$

A substantial path loss is expressed as a function L(d) in [Equation 12]. An Okumura-Hata model applies in designing an RACH in the LTE system.

Figure 10:
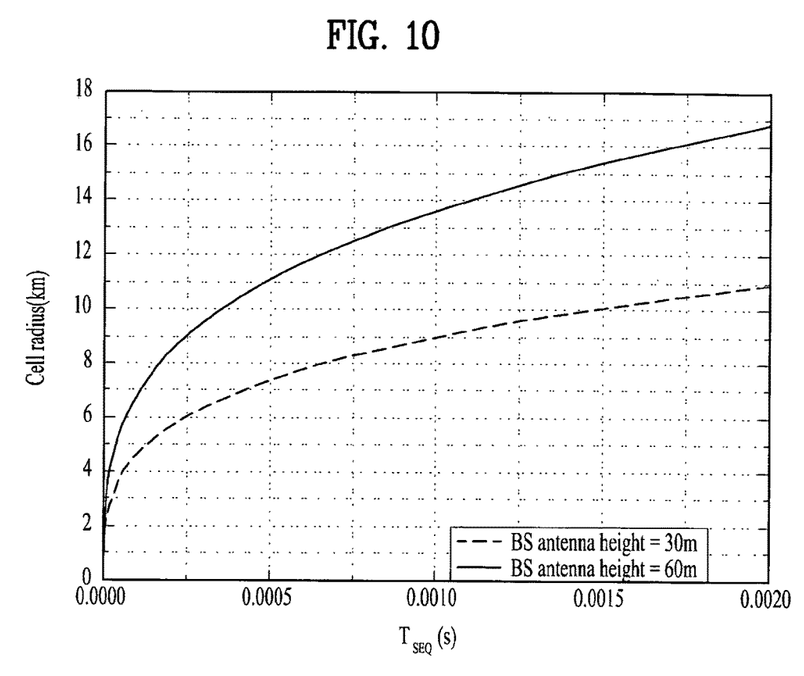
FIG. 10 is a graph illustrating RACH sequence length versus service coverage in the LTE system.

FIG. 10 is a graph illustrating RACH sequence length versus service coverage in the LTE system. Particularly, a suburban situation of the Okumura-Hata model is taken in FIG. 10. Referring to FIG. 10, it is noted that if a BS height is 60 m at a point where the sequence length $T_{SEQ}$ is 1 ms, the service coverage is about 14 km.

Figure 11:
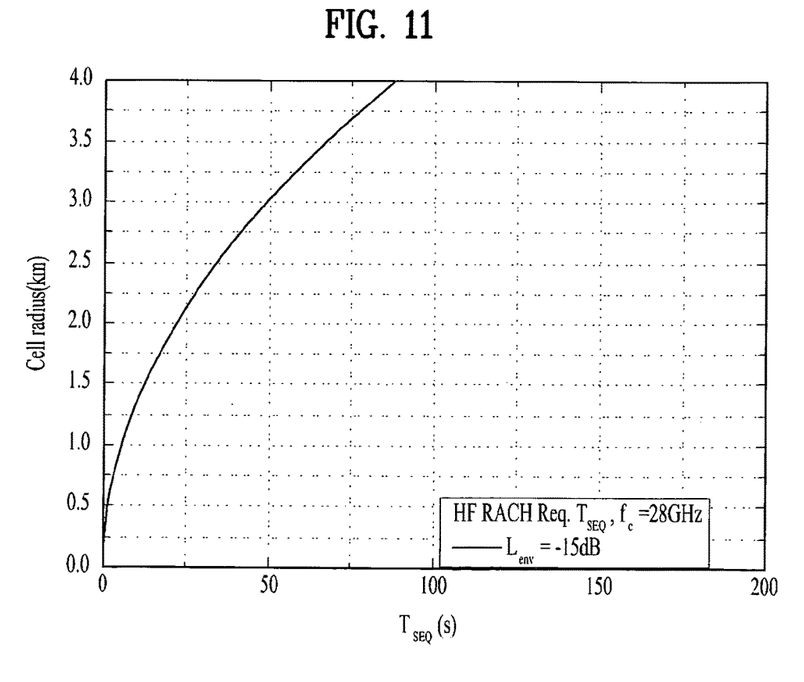
FIG. 11 is a graph illustrating RACH sequence length versus service coverage in a high carrier frequency system.

For verification in the high carrier frequency case, a Local Multipoint Distribution Services (LMDS) model applies to the path loss function L(d). FIG. 11 is a graph illustrating RACH sequence length versus service coverage in the high carrier frequency system. Referring to FIG. 11, it is noted that a service coverage with a sequence length $T_{SEQ}$ of 111.3 μs is appropriately 14 km, far larger than a target coverage of 3 km.

As described above, an RACH transmission period may vary with a service coverage and a TTI. In addition, to maintain orthogonality with an existing OFDM frame, an RACH subcarrier spacing should be an integer multiple of an existing subcarrier spacing. This means that the RACH subcarrier spacing gets shorter in the frequency domain and an RACH OFDM symbol having a longer period than an existing OFDM symbol period is set in the time domain. That is, an RACH OFDM symbol is designed to be k times longer than an existing OFDM symbol based on the relationship that $\Delta f_{RA} = \Delta f/k$.

In the present invention, an RACH sequence length is determined based on the relationship between an OFDM symbol period and an RACH OFDM symbol period.

Figure 12:
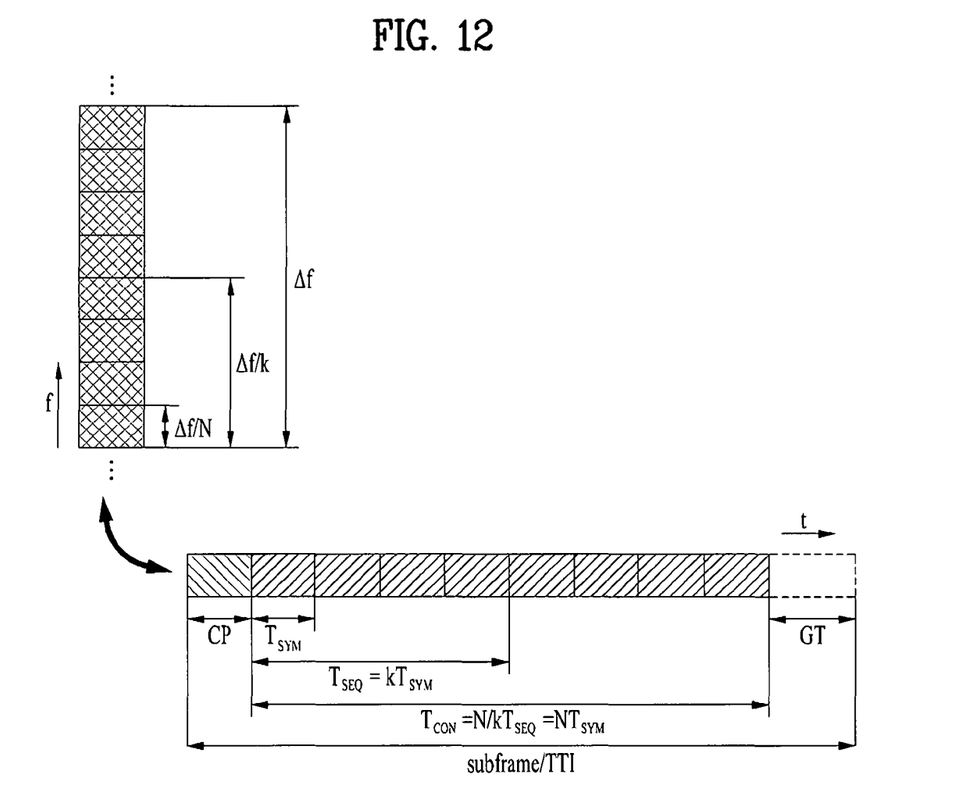
FIG. 12 illustrates a relationship between an RACH subcarrier spacing and an RACH sequence length.

FIG. 12 illustrates a relationship between an RACH subcarrier spacing and an RACH sequence length.

Particularly, the length of an RACH sequence is determined for a case where an RACH OFDM symbol period is longer than an existing OFDM symbol period by N times in FIG. 12. As noted from the frequency axis in the upper drawing of FIG. 12, the increase of the period of an RACH OFDM symbol to an N multiple of the length of an existing OFDM symbol means the decrease of the existing OFDM subcarrier spacing $\Delta f$ to $1/N$. The RACH OFDM symbol period is set substantially by $\Delta f_{RA}=\Delta f/k$, $1 \leq k \leq N$ as in [Equation 9].

That is, if the RACH symbol transmission period within a TTI is set to be longer than the existing OFDM symbol period by N times, this implies that the length of an actual RACH sequence transmitted by a UE is equal to or smaller than an N multiple of the existing OFDM symbol period. For example, if N=8, a container period $T_{CON}$ during which an RACH may be transmitted is 8 times longer than the existing OFDM symbol period $T_{SYM}$.

If the RACH sequence length $T_{SEQ}$ is calculated by $T_{SEQ}=1/\Delta f_{RA}=2/\Delta f$ according to condition #1, condition #2, and condition #3, k=2. Consequently, the actual RACH sequence length $T_{SEQ}$ is reduced to ½, relative to the container period $T_{CON}$.

As described above, the present invention provides methods for setting an RACH sequence length within a TTI longer than the existing OFDM symbol period by N times.

<Embodiment 1>

If the actual length of an RACH sequence is smaller than N symbols in an RACH transmission period N times longer than an existing OFDM symbol period, the RA sequence may be repeated in the time domain, for transmission.

For the convenience of description, if the RACH sequence is designed to be k times longer than an existing OFDM symbol (i.e. $T_{SEQ}=k\ T_{SYM}$) and the total RACH transmission period $T_{CON}$ is equal to $N \cdot T_{SYM}$, the repetition time of the RACH sequence is determined by [Equation 13] because N≥k.

$$\text{Repetition Time } (R) = \left\lfloor \frac{T_{CON}}{T_{SEQ}} \right\rfloor = \left\lfloor \frac{N}{k} \right\rfloor \quad \text{[Equation 13]}$$

Figure 13:
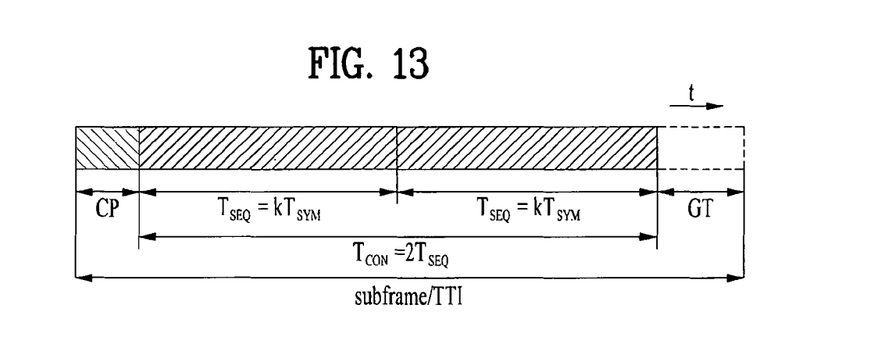
FIG. 13 illustrates an exemplary setting of the length of an RACH sequence that is transmitted twice repeatedly during a Transmission Time Interval (TTI) according to an embodiment of the present invention.

FIG. 13 illustrates an exemplary setting of the length of an RACH sequence that is transmitted repeatedly twice during a TTI according to an embodiment of the present invention.

Referring to FIG. 13, if N=8 and k=4, the repetition time of an RACH sequence is 2 and thus the length $T_{SEQ}$ of the RACH sequence is doubled during a TTI. The repetition time is determined based on a relationship between an RACH transmission period and an RACH sequence length. If the repetition time is 1, the RACH transmission time period is equal to the RACH sequence length during a TTI in an extreme case.

<Embodiment 2>

If the actual length of an RACH sequence is smaller than N in an RACH transmission period N times longer than an existing OFDM symbol period, the RACH sequence may be repeated not in the time domain but in the frequency domain.

As in Embodiment 1, if the RACH sequence is designed to be k times longer than the existing OFDM symbol (i.e. $T_{SEQ}=k\ T_{SYM}$) and the total RACH transmission period $T_{CON}$ is equal to $N \cdot T_{SYM}$, the repetition time of the actual RACH sequence length is determined by [Equation 13] because N≥k.

Compared to Embodiment 1 in which an RACH symbol is repeatedly transmitted in the time domain, frequency-domain sequence allocation is controlled such that one-period RACH symbols may be transmitted during an RACH transmission period within a TTI in the frequency domain.

That is, if the length of an RACH sequence $x_n$, ($0 \leq n < N_{SEQ}$) is $N_{SEQ}$, the total length of the RACH sequence is increased to a multiple of a repetition time, expressed as [Equation 14].

$$x_m = x_p \quad \text{[Equation 14]}$$
$$\begin{cases} p = \lfloor m/R \rfloor \\ 0 \leq n < N_{SEQ} \\ 0 \leq m < R \cdot N_{SEQ} \end{cases}$$

This method may be useful, when an RACH sequence length and symbol period are determined so as to support various bandwidths.

Figure 14:
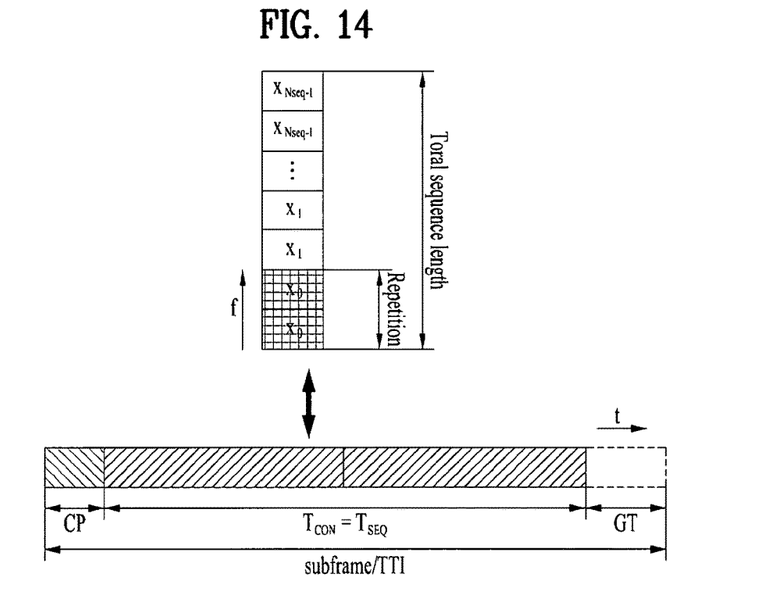
FIG. 14 illustrates an exemplary allocation of an RACH sequence in the frequency domain, for one-period transmission during a TTI according to an embodiment of the present invention.

FIG. 14 illustrates an exemplary allocation of an RACH sequence in the frequency domain, for one-period transmission during a TTI according to an embodiment of the present invention.

Referring to FIG. 14, if N=8 and k=4, the repetition time is 2. In this case, while an RACH sequence of length $T_{SEQ}$ is transmitted once during a TTI, the RACH sequence may be repeated in the frequency domain.

This implies that the basic RACH subcarrier spacing $\Delta f_{RA}$ is equal but a substantially occupied RACH subcarrier spacing is $2 \cdot \Delta f_{RA}$ in allocating one RACH sequence. In this case, the substantial occupied RACH subcarrier spacing is given as the following equation.

$$\text{Occupied } \Delta f_{RA} = R \cdot \frac{\Delta f}{k} \quad \text{[Equation 15]}$$
$$R = \left\lfloor \frac{T_{CON}}{T_{SEQ}} \right\rfloor = \left\lfloor \frac{N}{k} \right\rfloor$$

As described above, the present invention provides a method for designing an RACH along a time axis adaptively according to a communication environment using a high carrier frequency. Particularly, an operation scenario centering on a small cell is feasible because path loss is large due to a high center frequency of the high carrier frequency. However, the present invention is not limited thereto.

Figure 15:
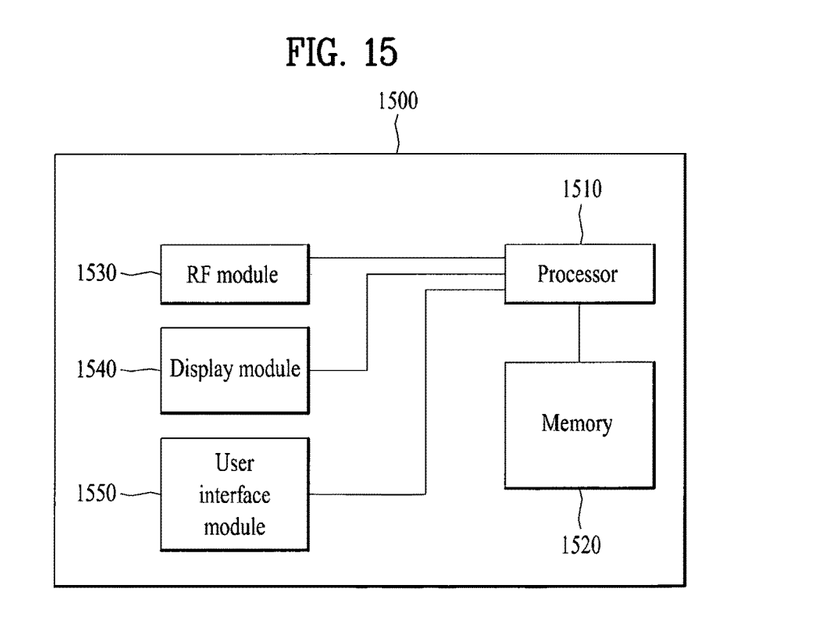
FIG. 15 is a block diagram of a communication apparatus according to an embodiment of the present invention.

FIG. 15 is a block diagram of a communication apparatus according to an embodiment of the present invention.

Referring to FIG. 15, a communication apparatus 1500 includes a processor 1510, a memory 1520, a Radio Frequency (RF) module 1530, a display module 1540, and a User Interface (UI) module 1550.

The communication device 1500 is shown as having the configuration illustrated in FIG. 15, for the convenience of description. Some modules may be added to or omitted from the communication apparatus 1500. In addition, a module of the communication apparatus 1500 may be divided into more modules. The processor 1510 is configured to perform operations according to the embodiments of the present invention described before with reference to the drawings. Specifically, for detailed operations of the processor 1510, the descriptions of FIGS. 1 to 14 may be referred to.

The memory 1520 is connected to the processor 1510 and stores an Operating System (OS), applications, program codes, data, etc. The RF module 1530, which is connected to the processor 1510, upconverts a baseband signal to an RF signal or downconverts an RF signal to a baseband signal. For this purpose, the RF module 1530 performs digital-to-analog conversion, amplification, filtering, and frequency upconversion or performs these processes reversely. The display module 1540 is connected to the processor 1510 and displays various types of information. The display module 1540 may be configured as, not limited to, a known component such as a Liquid Crystal Display (LCD), a Light Emitting Diode (LED) display, and an Organic Light Emitting Diode (OLED) display. The UI module 1550 is connected to the processor 1510 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The method and apparatus for transmitting an RACH designed for transmission in a high carrier frequency in a wireless communication system have been described in the context of a 3GPP LTE system. Besides, the present invention is applicable to many other wireless communication systems.

The invention claimed is:

1. A method for transmitting a random access preamble at a user equipment in a wireless communication system, the method comprising:

determining a random access sequence transmission period using a random access sequence;
configuring a random access preamble by inserting a cyclic prefix at a front of the random access sequence transmission period and a guard time at an end of the random access sequence transmission period; and
transmitting the random access preamble on a random access channel to a base station,
wherein configuring the random access preamble comprises configuring the random access preamble by repeating the random access sequence a predetermined number of times along a frequency axis, if the length of the random access sequence is smaller than the random access sequence transmission period,
wherein the random access sequence $x_m$ repeated the predetermined number of times is expressed as [Equation A], $$x_m = x_p \quad [\text{Equation A}]$$
$$\begin{cases} p = \lfloor m/R \rfloor \\ 0 \leq m < R \cdot N_{SEQ} \end{cases},$$

and
wherein $x_p$ is a random access sequence of length $N_{SEQ}$, and R is the predetermined number.

2. The method according to claim 1, wherein the predetermined number is a quotient of dividing the random access sequence transmission period by the length of the random access sequence.

3. The method according to claim 1, wherein a subcarrier spacing of the random access channel is increased by a multiple of the predetermined number.

4. A user equipment in a wireless communication system, the user equipment comprising:

a processor for determining a random access sequence transmission period using a random access sequence and configuring a random access preamble by inserting a cyclic prefix at a front of the random access sequence transmission period and a guard time at an end of the random access sequence transmission period; and
a transmission module for transmitting the random access preamble on a random access channel to a base station,
wherein the processor configures the random access preamble by repeating the random access sequence a predetermined number of times along a frequency axis, if the length of the random access sequence is smaller than the random access sequence transmission period,
wherein the random access sequence $x_m$ repeated the predetermined number of times is expressed as [Equation A], $$x_m = x_p \quad [\text{Equation A}]$$
$$\begin{cases} p = \lfloor m/R \rfloor \\ 0 \leq m < R \cdot N_{SEQ} \end{cases},$$

and
wherein $x_p$ is a random access sequence of length $N_{SEQ}$ and R is the predetermined number.

5. The user equipment according to claim 4, wherein the predetermined number is a quotient of dividing the random access sequence transmission period by the length of the random access sequence.

6. The user equipment according to claim 4, wherein a subcarrier spacing of the random access channel is increased by a multiple of the predetermined number.

* * * * *